US010678059B1

(12) United States Patent
Sirimamilla et al.

(10) Patent No.: US 10,678,059 B1
(45) Date of Patent: Jun. 9, 2020

(54) CONCEALED SHOCK PROTECTOR FOR HEAD-MOUNTED DEVICE DISPLAY

(71) Applicant: Microsoft Technology Licensing, LLC, Redmond, WA (US)

(72) Inventors: Pavana Abhiram Sirimamilla, Bothell, WA (US); Glen Patrick Gordon, Graham, WA (US); Yinan Wu, Bellevue, WA (US); Seyed Ehsan Mirbagheri, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/373,346

(22) Filed: Apr. 2, 2019

(51) Int. Cl.
*G02B 6/32* (2006.01)
*G02B 27/01* (2006.01)
*F21V 8/00* (2006.01)

(52) U.S. Cl.
CPC ....... *G02B 27/0176* (2013.01); *G02B 6/0076* (2013.01); *G02B 6/0088* (2013.01); *G02B 6/0093* (2013.01); *G02B 27/0172* (2013.01); *G02B 2027/015* (2013.01); *G02B 2027/0152* (2013.01); *G02B 2027/0178* (2013.01)

(58) Field of Classification Search
CPC .............. G02B 27/0176; G02B 6/0093; G02B 6/0076; G02B 6/0088; G02B 27/0172; G02B 2027/0178; G02B 2027/015; G02B 2027/0152
See application file for complete search history.

(56) References Cited

U.S. PATENT DOCUMENTS

| | | |
|---|---|---|
| 8,189,263 B1 | 5/2012 | Wang et al. |
| 8,605,008 B1 | 12/2013 | Prest et al. |
| 9,001,005 B2 | 4/2015 | Abdollahi et al. |
| 9,759,923 B2 | 9/2017 | Pletenetskyy |
| 9,776,084 B2 | 10/2017 | Allin et al. |
| 2008/0297998 A1 | 12/2008 | Choi |
| 2014/0168260 A1 | 6/2014 | O'Brien et al. |
| 2015/0355409 A1* | 12/2015 | Yanagisawa ........... G02B 6/322 385/14 |
| 2018/0292672 A1* | 10/2018 | Patin ........................ G02C 1/08 |
| 2018/0372926 A1* | 12/2018 | Karafin ..................... G06F 3/01 |

FOREIGN PATENT DOCUMENTS

WO  2018170495 A1  9/2018

* cited by examiner

*Primary Examiner* — Ellen E Kim

(74) *Attorney, Agent, or Firm* — Ray Quinney & Nebeker P.C.; John O. Carpenter

(57) ABSTRACT

A device for displaying visual information to a user includes a waveguide and a lens positioned proximate the waveguide. The waveguide and lens are fixed relative to one another at a top portion of the waveguide and a top portion of the lens. An impact absorber is positioned between a part of the waveguide and a part of the lens, where the impact absorber is affixed to only one of the waveguide and the lens.

20 Claims, 7 Drawing Sheets

CONCEALED SHOCK PROTECTOR FOR HEAD-MOUNTED DEVICE DISPLAY

BACKGROUND

Background and Relevant Art

A head-mounted device (HMD) can display visual information to a user through a near-eye display (NED). A transparent NED provides visual information to a user while the user can still observe the surrounding physical environment. A transparent NED can present mixed reality visual information by directing light representing virtual objects in front to the user's eyes to interweave the virtual objects with the user's view of the physical environment.

A transparent NED uses a set of waveguides to direct light from a light source to an area in front of the user's eyes and in the user's field of view. The weight of the NED and associated electronic components of the HMD greatly affects the user's experience with the HMD. The weight balance and size of the HMD affect the fatigue experienced by the user. Decreasing weight and size of the HMD can reduce fatigue on a user and improve adoption of HMDs.

BRIEF SUMMARY

In some embodiments, a device for displaying visual information to a user includes a waveguide and a lens positioned proximate the waveguide. The waveguide and lens are fixed relative to one another at a top portion of the waveguide and a top portion of the lens. An impact absorber is positioned between a part of the waveguide and a part of the lens, where the impact absorber is affixed to only one of the waveguide and the lens.

In some embodiments, a system for displaying visual information to a user includes a display device configured to provide a display light and an optical system coupled to the display device to in-couple the display light into the optical system. The optical system includes a first waveguide, a second waveguide, and a lens positioned proximate the first waveguide. The first waveguide, second waveguide, and lens are fixed relative to one another at a top edge of the first waveguide, a top edge of the second waveguide, and a top portion of the lens. An impact absorber is positioned between a part of the first waveguide and a part of the lens, where the impact absorber is affixed to only to the lens.

In some embodiments, a system for displaying visual information to a user includes a display device configured to provide a display light and an optical system coupled to the display device to in-couple the display light into the optical system. The optical system includes a first waveguide having a thickness of less than 600 micrometers, a second waveguide having a thickness of less than 600 micrometers, and a lens positioned proximate the first waveguide. The first waveguide, second waveguide, and lens are fixed relative to one another at a top edge of the first waveguide, a top edge of the second waveguide, and a top portion of the lens. An impact absorber is positioned between a part of the first waveguide and a part of the lens, where the impact absorber is affixed to only to the lens. The impact absorber has a height of between 200 micrometers and 950 micrometers.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 8-1 through FIG. 8-6 is a cross-sectional view of a waveguide elastically deforming and contacting an impact absorber, according to at least one embodiment of the present disclosure;

DETAILED DESCRIPTION

This disclosure generally relates to devices, systems, and methods for presenting visual information to a user with a near-eye display (NED). More particularly, the present disclosure relates to improving the durability and operational lifetime of a NED including a waveguide proximate a lens or other optical element. The waveguide can elastically deform (i.e., flex) in the event of an drop or other impact. The elastic deformation of the waveguide can result in damage to the waveguide. The waveguide directs display light to a user's field of view to communicate visual information to the user.

In some embodiments, the user's field of view may be at least partially encompassed by a waveguide through which the user views their surroundings. The waveguide may direct display light from a display device to the user's field of view. The waveguide may guide the display light before out-coupling the light at an extraction region. Upon out-coupling the light, the waveguide may combine the visual information of the display light with ambient light from the user's surroundings to deliver the visual information to the user. Overlaying the visual information from the HMD on the user's surroundings may require precise generation and positioning of the visual information relative to the user's eyes.

Visual information including virtual elements such as virtual objects or text may be positioned in the user's field of view on the waveguide or other NED. To make the NED as light and compact as possible, the waveguides and other lenses are positioned close together, increasing the likelihood of contact between a waveguide and lens. An impact absorber positioned between the waveguide and lens can prevent damage to the waveguide during use and/or transport.

Figure 1:
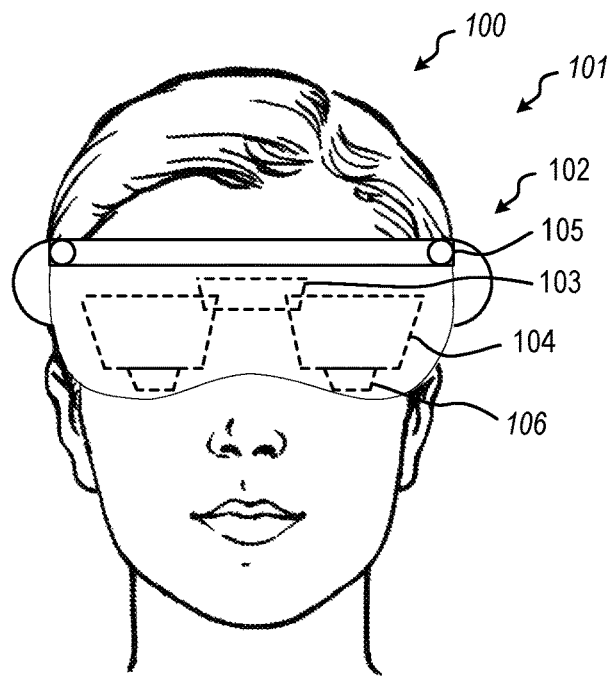
FIG. 1 is a perspective view of a head-mounted display (HMD) including a waveguide, according to at least one embodiment of the present disclosure.

FIG. 1 is a perspective view of a user 100 wearing a HMD 101. In some embodiments, the HMD 101 may have a housing 102 that contains one or more processors, storage devices, power supplies, audio devices, display devices, cameras, communication devices, or combinations thereof, that receive, collect, store, process, or calculate information that is provided to the user. For example, a display device 103 may be positioned optically adjacent a waveguide(s) or other near eye display 104 to provide visual information to the waveguide 104, which may, in turn, be presented in the user's field of view by the waveguide 104.

In some embodiments, the HMD 101 has at least one waveguide 104 positioned near the user 100 to direct visual information to the user 100. The HMD 101 may include a single waveguide 104, a separate waveguide 104 for each of the user's eyes (i.e., two waveguides 104), or more than two waveguides 104 to provide visual information in multiple overlaid channels or over a larger field of view.

In some embodiments, the HMD 101 may include one or more cameras 105 that may image the user's physical environment. For example, the camera(s) 105 may be visible light camera(s) 105 that may image the surrounding environment. A processor may perform image recognition routines on the visible light image to detect and recognize elements in the surrounding environment. In other examples, the camera(s) 105 may be depth sensing camera(s) that may create a depth image of the surrounding environment. For example, the camera 105 may be a time-of-flight camera, a structured light camera, stereo cameras, or other cameras that may use visible, infrared, ultraviolet, or other wavelengths of light to collect three-dimensional information about the surrounding environment. In at least one example, the camera(s) 105 may be gesture recognition cameras that allow the HMD 101 to recognize and interpret hand gestures performed by the user 100 in front of the HMD 101.

In some embodiments, the HMD 101 may further include a gaze-tracking device 106 positioned in the HMD 101 to track a direction of the user's gaze. The gaze-tracking device 106 may include a camera or a plurality of cameras to image the user's eyes. In other words, the gaze-tracking device 106 may image the user's pupil, iris, sclera, other portions of the user's eye, or combinations thereof to calculate the direction the user is looking. In some embodiments, the gaze-tracking device 106 may measure and/or calculate the x- and y-components of the user's gaze. In other embodiments, the gaze-tracking device 106 may include a gyroscope, an accelerometer, a plurality of sensors to triangulate position, or other devices that allow for the measurement of the orientation and/or position of the HMD relative to the virtual environment. For example, the user's "gaze" may be a ray cast from the HMD forward from the HMD to approximate the user's gaze by approximating the user's head position and orientation as their gaze direction.

Figure 2:
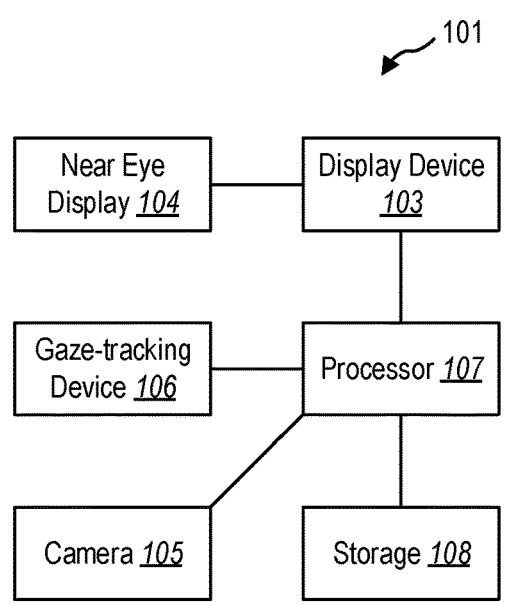
FIG. 2 is a schematic representation of the HMD of FIG. 1, according to at least one embodiment of the present disclosure.

FIG. 2 is a schematic representation of the HMD 101. The display device 103 in communication with the near eye display 104 may be in data communication with a processor 107. Similarly, the camera 105 and gaze-tracking device 106 may be in data communication with the processor 107. The processor 107 may further be in data communication with a storage device 108. The storage device 108 may be a hardware storage device, such as a platen-based storage device, a solid-state storage device, or other non-transitory or long-term storage device. The storage device 108 having instructions stored thereon to perform one or more methods or portions of a method described herein.

Figure 3:
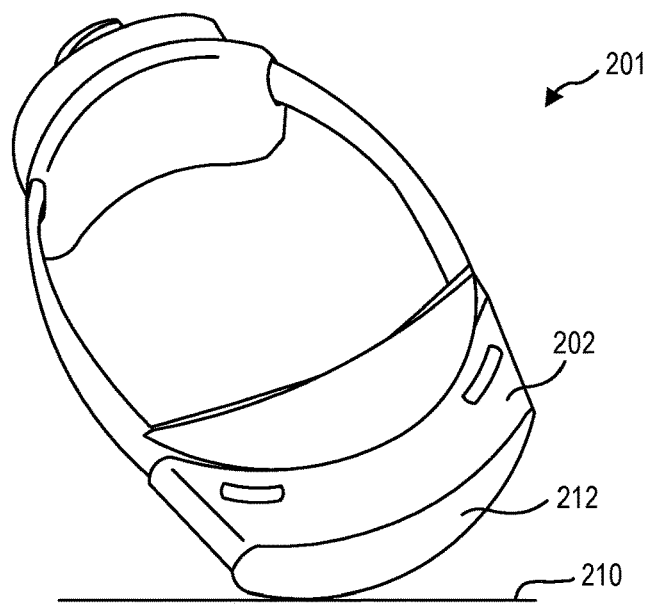
FIG. 3 is a side view of a HMD impacting a hard surface, according to at least one embodiment of the present disclosure.

FIG. 3 is an example of an HMD 201, such as the HMD 101 described in relation to FIG. 1 and FIG. 2, impacting a hard surface 210. For example, the HMD 201 may be dropped by a user onto a desk, table, floor, sidewalk, or other hard surface during use or during transport. The HMD 201 may contact the hard surface 210 with a portion of the housing 202, which transfers energy from the impact to one or more components of the HMD 201 in the housing 202.

In the example depicted in FIG. 3, the impact with a hard surface 210 can be received by a protective visor 212 of the HMD 201. The visor 202 can elastically deform and dissipate some of the energy before transmitting the remaining energy to the housing 202. The energy transmitted to the housing 202 can then be transmitted to the individual components, including the one or more waveguides of the near eye display. The waveguides are thin pieces of optically transmissive material and can elastically deform (e.g., flex) from an initial position. Because the HMD 201 contains many components (as described in relation to FIG. 1 and FIG. 2) and the size and weight of the HMD 201 can fatigue that is a barrier to adoption and use, the components are tightly arranged in the housing 202 and may contact one another in an impact. In particular, the waveguides and other optical components are thin and potentially brittle. The waveguides and other optical components are particularly susceptible to damage during a drop or other impact to the HMD 201.

Figure 4:
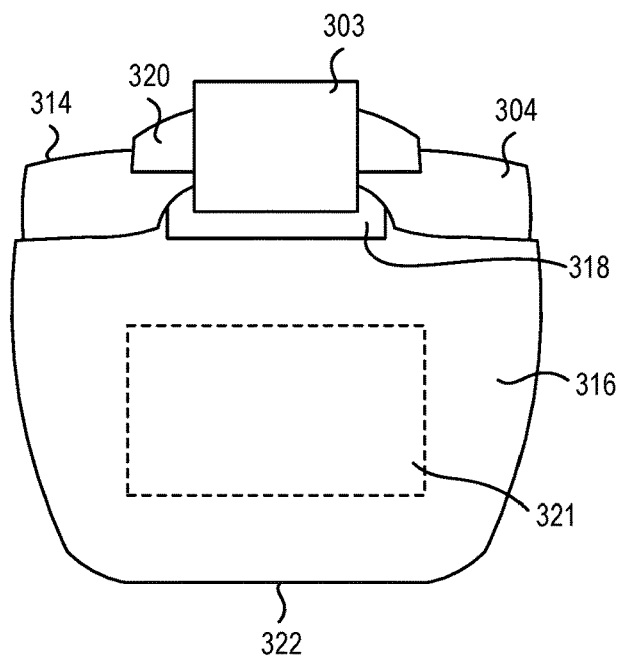
FIG. 4 is an optical system including at least one waveguide, according to at least one embodiment of the present disclosure.

FIG. 4 is an example optical system within an HMD according to the present disclosure. The optical system including a display device 303 in optical communication with a waveguide 304. The display device 303 in-couples display light into a top portion 314 of the waveguide 304, which is connected to the display device 303 by a waveguide fixture 320. The waveguide 304 directs the display light to an extraction region 321 away from the display device 303. A lens 316 is positioned over the waveguide 304 and is held in place relative to the waveguide 304 by a lens fixture 318. The lens 316 extends downward from the display device 303 to a bottom edge 322 and covers at least a portion of the waveguide 304. In some embodiments, the lens 316 is a two-meter lens. In other embodiments, the lens may be another optical element that has a different optical power.

In at least one embodiment, the lens 316 may wrap around at the bottom edge 322 and cover a lower portion and/or bottom edge of the waveguide, limiting light leakage and providing additional protection to the bottom edge of the waveguide 304. In some embodiments, such as shown in FIG. 5, a waveguide 404-1, 404-2 is positioned close enough to the lens 416 that an impact may elastically deform the waveguide 404-1, 404-2 sufficiently to contact the lens 416 and risk damaging the waveguide 404-1, 404-2 and/or lens 416.

Figure 5:
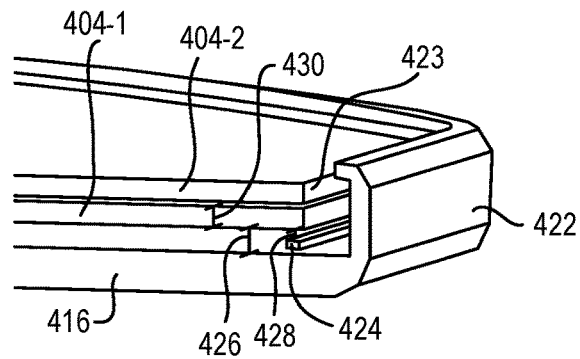
FIG. 5 is a cross-sectional view of the an optical system, according to at least one embodiment of the present disclosure.

In the side cross-sectional view presented in FIG. 5, the optical system includes a first waveguide 404-1 and a second waveguide 404-2. The first waveguide 404-1 and second waveguide 404-2 may each guide a separate channel of visual information. For example, the first waveguide 404-1 may guide a first color channel and the second waveguide 404-2 may guide a second color channel. In other examples, each of the first waveguide 404-1 and second waveguide 404-2 may guide a plurality of color channels and direct different portions of the visual information to a user's field of view. In at least one example, the first waveguide 404-1 may direct user interface information and the second waveguide 404-2 may direct mixed reality virtual objects. In at least another example, the first waveguide 404-1 may direct foreground visual information and the second waveguide 404-2 may direct background visual information (e.g., the first waveguide 404-1 and second waveguide 404-2 may present different simulated depth ranges in a user's field of view).

The waveguides 404-1, 404-2 use total internal reflection to direct the display light from the display device to the extraction region. An out-coupling optical element (such as a surface relief grating) positioned on a surface of the waveguides 404-1, 404-2 can out-couple the display light in an extraction region and direct the visual information to the user. The optical performance of the waveguides 404-1, 404-2 and, particularly, the out-coupling optical elements may be affected by strain or distortion of the waveguides 404-1, 404-2. Therefore, a bottom edge 423 of the waveguides 404-1, 404-2 proximate the bottom edge 422 of the lens 416 is free to move during use and/or transport. In some examples, a waveguide 404-1, 404-2 that is coupled to a frame on opposing edges (e.g., a top edge and a bottom edge) can experience optical distortion due to strain induced by differences in the thermal expansion of the waveguide material and the frame material. Leaving the bottom edge 423 free allows the waveguides 404-1, 404-2 to expand or contract relative to the waveguide fixture without inducing internal strain in the waveguides 404-1, 404-2.

A freely moving bottom edge 423, however, can allow flexion of the waveguides 404-1, 404-2 that results in contact between the waveguides 404-1, 404-2 and the lens 416 and potentially damages the waveguides 404-1, 404-2. An impact absorber 424 can be positioned between the lens 416 and the waveguides 404-1, 404-2 to reduce the force experienced by the waveguides 404-1, 404-2 when the waveguides 404-1, 404-2 flex toward the lens 416.

In some embodiments, the lens gap 426 between the proximate waveguide 404-1 and the lens 416 is less than 1 millimeter (mm). In other embodiments, the lens gap 426 between the proximate waveguide 404-1 and the lens 416 is less than 750 micrometers (μm). In yet other embodiments, the lens gap 426 between the proximate waveguide 404-1 and the lens 416 is less than 500 micrometers (μm). The impact absorber 424 does not fill the entire width of the lens gap 426. Rather, an impact absorber gap 428 between the impact absorber 424 and the proximate waveguide 404-1 may allow the waveguide 404-1 to expand or contract with changes in temperature, as well as allow the waveguide 404-1 to deflect and return to an initial position to ensure the optical performance and alignment of the waveguides 404-1, 404-2 remain in calibration.

The impact absorber gap 428 between the impact absorber 424 and the proximate waveguide 404-1 may be in a range having an upper value, a lower value, or an upper and lower value including any of 50 μm, 100 μm, 150 μm, 200 μm, 250 μm, 300 μm, 400 μm, 500 μm, or any values therebetween. For example, the impact absorber gap 428 may be greater than 50 μm. In other examples, the impact absorber gap 428 may be less than 500 μm. In yet other examples, the impact absorber gap 428 may be between 50 μm and 500 μm. In further examples, the impact absorber gap 428 may be between 100 μm and 250 μm. In at least one example, the impact absorber gap 428 is about 190 μm.

In some embodiments, the first waveguide 404-1 proximate the lens 416 has a waveguide thickness 430 in a range having an upper value, a lower value, or upper and lower values including any of 500 μm, 550 μm, 600 μm, 650 μm, 700 μm, 800 μm, 900 μm, 1.0 mm, or any values therebetween. For example, the waveguide thickness 430 may be greater than 500 μm. In other examples, the waveguide thickness 430 may be less than 1.0 mm. In yet other examples, the waveguide thickness 430 may be between 500 μm and 1.0 mm. In further examples, the waveguide thickness 430 may be between 550 μm and 800 μm. In at least one example, the waveguide thickness 430 is about 600 μm.

FIG. 5 illustrates the impact absorber 424 fixed to the lens 416 and spaced apart from the waveguides 404-1, 404-2. In other embodiments, the impact absorber 424 may be positioned on the proximate waveguide 404-1. However, positioning the impact absorber 424 on the proximate waveguide 404-1 increases the moment of inertia of the waveguides 404-1, 404-2, which can destabilize the waveguides 404-1, 404-2 during use. Additionally, positioning the impact absorber 424 on the proximate waveguide 404-1 may introduce an additional coefficient of thermal expansion mismatch between the impact absorber 424 and the proximate waveguide 404-1, which can result in thermal strain in the waveguides 404-1, 404-2.

In some embodiments, the impact absorber 424 is fixed to the lens 416 about 1 mm from the end of the inner surface of the lens 416 adjacent the bottom edge 422. In other embodiments, the impact absorber 424 is fixed to the lens 416 about 750 μm from the end of the inner surface of the lens 416 adjacent the bottom edge 422. In other embodiments, the impact absorber 424 is fixed to the lens 416 about 500 μm from the end of the inner surface of the lens 416 adjacent the bottom edge 422.

The impact absorber 424 is positioned near the bottom edge 423 of the waveguides 404-1, 404-2 to provide the greatest control of the deceleration of the waveguide 404-1, 404-2 during an impact. In some embodiments, the impact absorber 424 is fixed to the lens 416 such that the impact absorber 424 contacts the waveguide 404-1 less than 50 μm from the bottom edge 423 of the waveguide 404-1. In other embodiments, the impact absorber 424 is fixed to the lens 416 such that the impact absorber 424 contacts the waveguide 404-1 less than 100 μm from the bottom edge 423 of the waveguide 404-1. In other embodiments, the impact absorber 424 is fixed to the lens 416 such that the impact absorber 424 contacts the waveguide 404-1 less than 250 μm from the bottom edge 423 of the waveguide 404-1.

Figure 6:
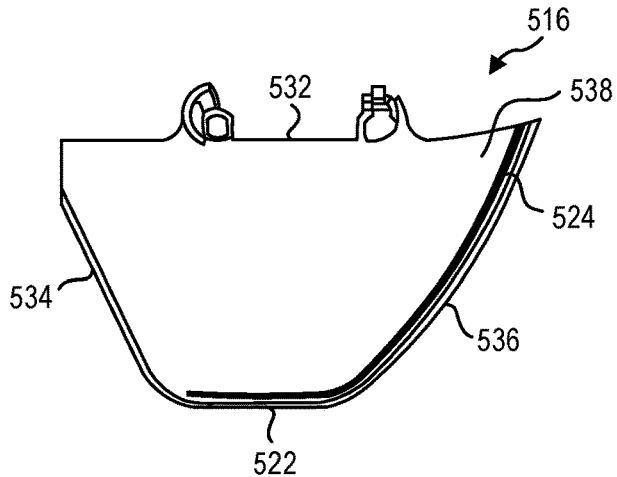
FIG. 6 is a rear view of a lens, according to at least one embodiment of the present disclosure.

FIG. 6 is a rear view of an embodiment of a lens 516 with an impact absorber 524 fixed thereto. The lens 516 has a bottom edge 522, a top edge 532, an inner edge 534 that is positioned proximate the nose bridge of the HMD, and an outer edge 536 that is positioned distal the nose bridge of the HMD. In some embodiments, the impact absorber 524 is fixed proximate the bottom edge 522 on an inner surface 538 of the lens 516. In other embodiments, the impact absorber 524 is fixed proximate the outer edge 536 of the lens 516. In yet other embodiments, the impact absorber 524 is fixed to the lens 516 proximate the bottom edge 522 and the outer edge 536 of the lens 516. During impact testing, the waveguides were most likely to contact the lens 516 along the bottom edge 522 and along the outer edge 536. Further, the waveguides are fixed along the top edge 532, with the area of greatest displacement during flexion occurring proximate the bottom edge.

Figure 7:
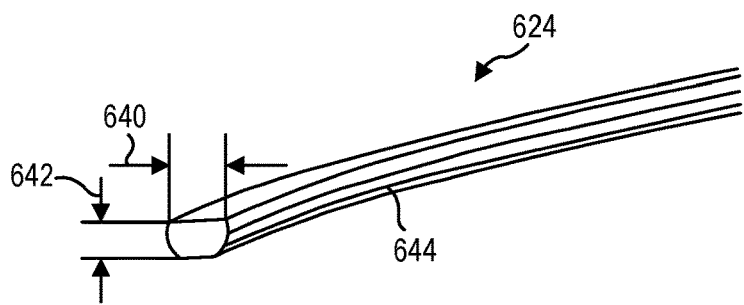
FIG. 7 is a cross-sectional view of an impact absorber, according to at least one embodiment of the present disclosure.

FIG. 7 is an end cross-sectional view of an embodiment of an impact absorber 624, according to the present disclosure. The impact absorber 624 may have a cross-sectional shape that is generally oval, as shown in FIG. 7. In other embodiments, the cross-sectional shape may be generally rectangular, triangular, trapezoidal, or other polygonal shape. The cross-sectional shape of the impact absorber 624 may alter a force curve of the impact absorber 624 during compression between the lens and the waveguide, as will be described herein. For example, a rectangular cross-sectional shape of the impact absorber 624 may yield a more linear force curve during compression, while a circular cross-sectional shape may yield a more exponential force curve during compression.

In some embodiments, the elastic modulus of an impact absorber material is in a range having an upper value, a lower value, or upper and lower values including any of 0.5 Megapascals (MPa), 0.6 MPa, 0.7 MPa, 0.8 MPa, 0.9 MPa, 1.0 MPa, 1.1 MPa, 1.2 MPa, 1.3 MPa, 1.4 MPa, 1.5 MPa, or any values therebetween. For example, the elastic modulus may be greater than 0.5 MPa. In other examples, the elastic modulus may be less than 1.5 MPa. In yet other examples, the elastic modulus may be between 0.5 MPa and 1.5 MPa. In further examples, the elastic modulus may be between 0.75 MPa and 1.25 MPa. In at least one example, the elastic modulus is about 1.0 MPa.

In some embodiments, the impact absorber 624 has a width 640 (i.e., perpendicular to a direction of compression) in a range having an upper value, a lower value, or upper and lower values including any of 200 μm, 250 μm, 300 μm, 350 μm, 400 μm, 450 μm, 500 μm 600 μm, 700 μm, 800 μm 900 μm, or any values therebetween. For example, the width 640 may be greater than 200 μm. In other examples, the width 640 may be less than 900 μm. In yet other examples, the width 640 may be between 200 μm and 900 μm. In further examples, the width 640 may be between 300 μm and 750 μm. In at least one example, the width 640 is about 500 μm.

In some embodiments, the impact absorber 624 has a height 642 (i.e., in the direction of compression) in a range having an upper value, a lower value, or upper and lower values including any of 200 μm, 250 μm, 300 μm, 350 μm, 400 μm, 450 μm, 500 μm 600 μm, 700 μm, 800 μm, 900 μm, 950 μm, or any values therebetween. For example, the height 642 may be greater than 200 μm. In other examples, the height 642 may be less than 950 μm. In yet other examples, the height 642 may be between 200 μm and 950 μm. In further examples, the height 642 may be between 300 μm and 750 μm. In at least one example, the height 642 is about 500 μm. In at least another example, the height 642 is about 60% to about 80% of the lens gap described in relation to FIG. 5.

Figures 1, 8:
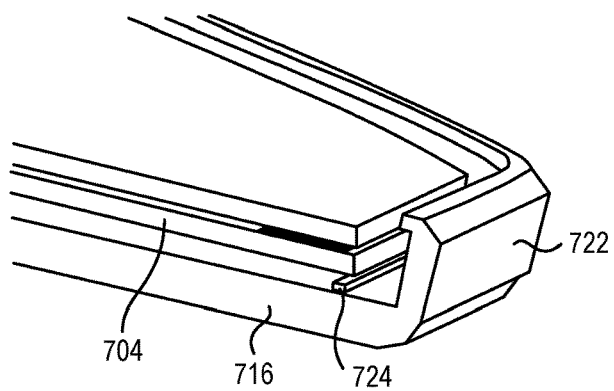
Figures 2, 8:
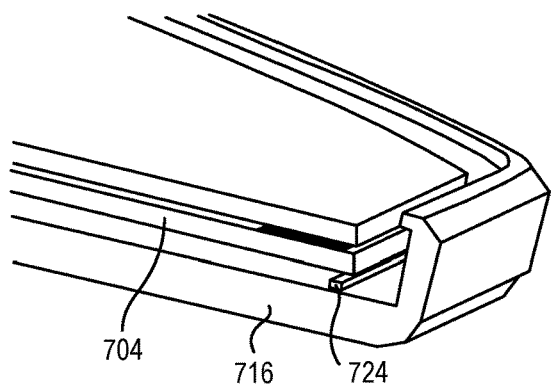
Figures 3, 8:
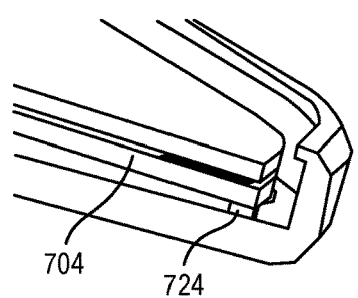
Figures 4, 8:
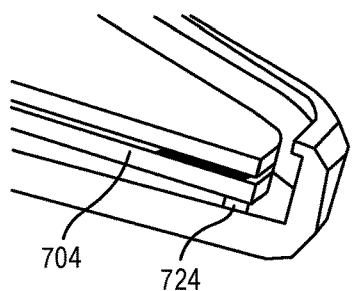
Figures 5, 8:
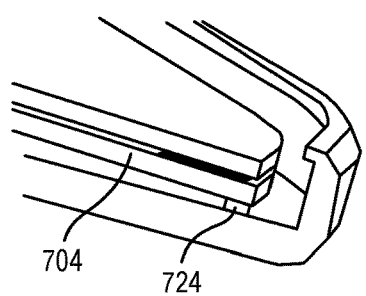
Figures 6, 8:
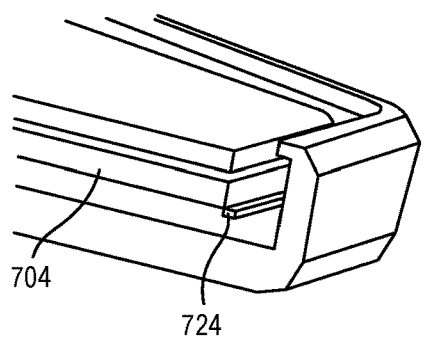

FIG. 8-1 through 8-6 illustrate an example impact to an HMD with an optical system including an impact absorber 724 according to the present disclosure. FIG. 8-1 is a cross-sectional perspective view of an optical system including a plurality of waveguides 704 and a lens 716 with the impact absorber 724 positioned proximate at least the bottom edge 722 of the lens 716. FIG. 8-2 illustrates the flexion of the waveguides 704 approximately two milliseconds after an impact to the housing of the HMD. In smaller impacts, the waveguides 704 flex and approach the impact absorber 724 without contacting the impact absorber 724, as shown in FIG. 8-2 at 2.0 milliseconds, before returning to the initial position shown in FIG. 8-1. In such embodiments, the elastic deformation of the waveguides 704 provides a restoring force to decelerate the waveguides 704 relative to the lens 716 and urge the waveguides 704 back to the initial position. In more significant impacts, the waveguides 704 contact the impact absorber 724, as shown in FIG. 8-3 at 2.5 milliseconds after impact, which applies a second force to the waveguides 704 to decelerate and/or urge the waveguides 704 toward the initial position.

FIG. 8-4 shows the compression of the impact absorber 724 by the waveguides 704 to approximately half of the initial height of the impact absorber 724. After 3.5 milliseconds, shown in FIG. 8-5, the elastic deformation of the impact absorber 724 and the elastic deformation of the waveguides 704 urge the waveguides 704 toward to the initial position. The impact absorber 724 returns to the initial shape after contact with the waveguides 704 ends. After approximately 5.0 milliseconds, both the waveguides 704 and impact absorber 724 have returned to the initial state, shown in FIG. 8-6.

Figure 9:
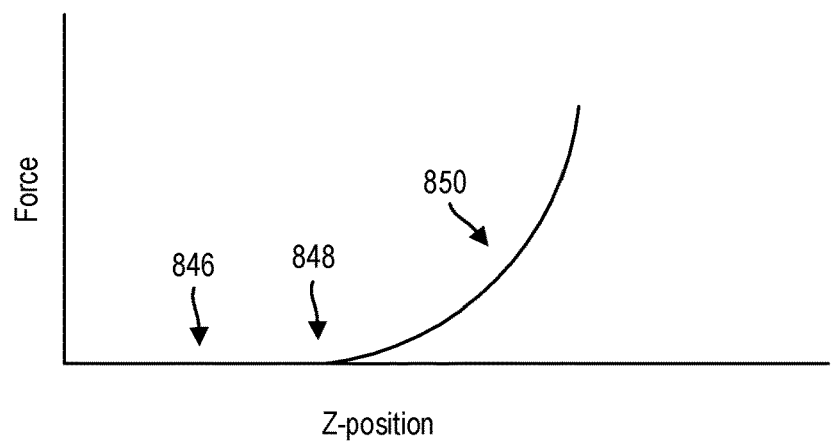
FIG. 9 is a graph illustrating a force curve of an impact absorber, according to at least one embodiment of the present disclosure.

FIG. 9 is a graph showing an example relationship between the displacement of the waveguides relative to the inner surface of a lens and the force applied by the impact absorber. The waveguide can flex in the z-direction through a free movement region 846 relative to the lens and impact absorber without contacting the impact absorber. The force applied by the impact absorber begins with the contact 848 of the waveguide with the impact absorber. As the impact absorber compresses through the compression region 850, the force applied by the impact absorber increases. The force curve illustrated in FIG. 9 can be altered by altering the shape and/or construction of the impact absorber.

Figure 10:
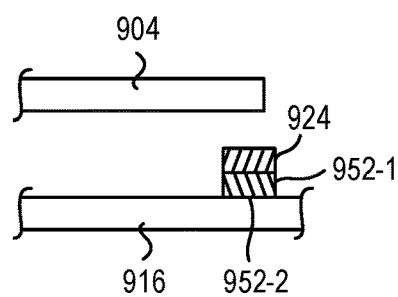
FIG. 10 is a cross-sectional view of a dual material impact absorber, according to at least one embodiment of the present disclosure.
Figure 11:
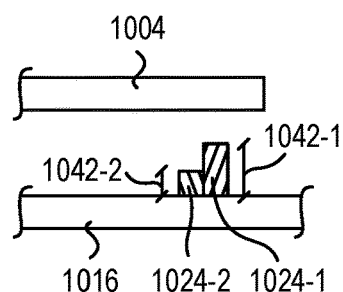
FIG. 11 is a cross-sectional view of a dual height impact absorber, according to at least one embodiment of the present disclosure.

FIG. 10 and FIG. 11 illustrate embodiments of an impact absorber with a two-stage compression. FIG. 10 is a cross-sectional view of an embodiment of an impact absorber 924 that is formed of two different impact absorber materials layered upon one another, where a first impact absorber material 952-1 has a first elastic modulus and the second impact absorber material 952-2 has a second elastic modulus. For example, the first impact absorber material 952-1 may have a lower elastic modulus than the second impact absorber material 952-2. The waveguide 904 may flex toward the lens 916, compressing the first impact absorber material 952-1 first and then the second impact absorber material 952-2. In other examples, the first impact absorber material 952-1 may have a higher elastic modulus than the second impact absorber material 952-2.

FIG. 11 is a cross-sectional view of an embodiment of an impact absorber 924 that is formed of two different impact absorber materials layered upon one another, where a first impact absorber material 952-1 has a first elastic modulus and the second impact absorber material 952-1 has a second elastic modulus. For example, the first impact absorber material 952-1 may have a lower elastic modulus than the second impact absorber material 952-2. The waveguide 904 may flex toward the lens 916, compressing the first impact absorber material 952-1 first and then the second impact absorber material 952-2. In other examples, the first impact absorber material 952-1 may have a higher elastic modulus than the second impact absorber material 952-2.

FIG. 11 is a cross-sectional view of another embodiment of an impact absorber that includes a plurality of impact absorbers 1024-1, 1024-2 with different heights 1042-1, 1042-2 or a single impact absorber with a plurality of heights. As the waveguide 1004 flexes toward the lens 1016, the waveguide 1004 will contact and begin to compress the first impact absorber 1024-1 at the first height 1042-1. The first impact absorber 1024-1 will decelerate the waveguide 1004 with a first force until the waveguide 1004 contacts and begins to compress second impact absorber 1024-2 at the second height 1042-2, also. The combination of the compression of the second impact absorber 1024-2 and the continued compression of the first impact absorber 1024-1 apply a second force greater than the first force to further slow the waveguide 1004.

Figure 12:
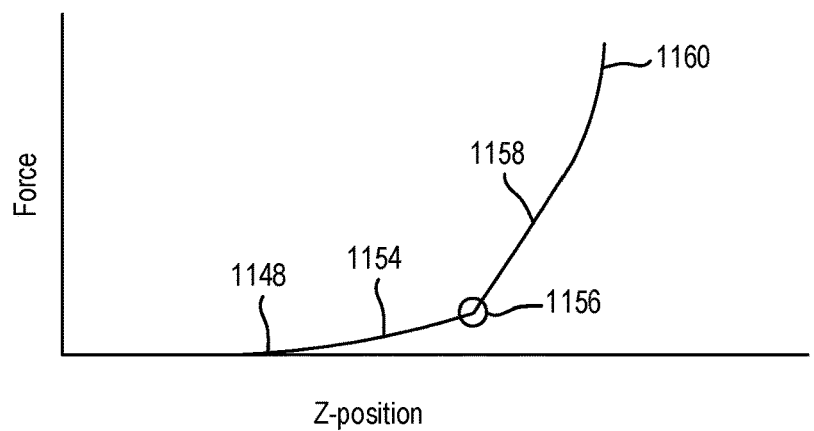
FIG. 12 is a graph illustrating a force curve of a dual compression impact absorber, according to at least one embodiment of the present disclosure.

FIG. 12 is a graph illustrating an example force curve of dual-stage impact absorbers, such as the embodiments described in relation to FIG. 10 and FIG. 11. The force curve is approximately linear after the contact 1148 through a first stage 1156 until the second contact 1158 with the second impact absorber. The second stage 1158 then reflects an increased force applied by the two impact absorbers until the waveguide bottoms out 1160 and compression ceases.

Figure 13:
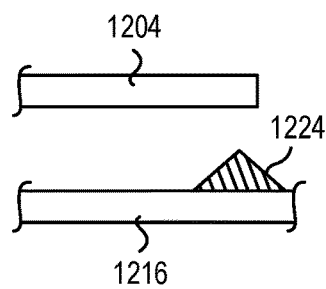
FIG. 13 is a cross-sectional view of a tapered impact absorber, according to at least one embodiment of the present disclosure.

FIG. 13 is a cross-sectional view of yet another embodiment of an impact absorber 1224. In some embodiments, the impact absorber 1224 has a progressively larger surface area as the impact absorber is compressed between the waveguide 1204 and the lens 1216. For example, the impact absorber may be triangular in cross-section, as shown in FIG. 13, semi-circular in cross-section, trapezoidal in cross-section, or other shape with a cross-sectional profile that is wider on one side than the other. In some examples, the impact absorber 1224 may be wider adjacent the lens 1216. In other examples, the impact absorber 1224 may be wider adjacent the waveguide 1204.

Figure 14:
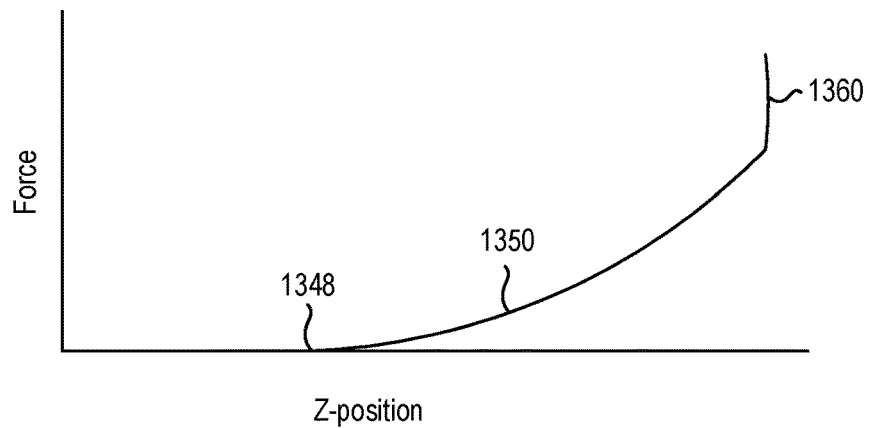
FIG. 14 is a graph illustrating a force curve of a tapered impact absorber, according to at least one embodiment of the present disclosure.

FIG. 14 is a graph illustrating an example force curve of a progressively wider impact absorber, such as the embodiment described in relation to FIG. 13. The force curve increase exponentially after the contact 1348 through the compression region 1350 until the waveguide bottoms out 1360 and compression ceases.

In at least one embodiment of the present disclosure, a optical system for use in a near-eye display can withstand increased impacts to the near-eye display without damage to the waveguides. Thinner and lighter display systems allow for greater flexibility, longer use, and increased adoption. An impact absorber positioned between the waveguides and lens of the optical system can increase the operational lifetime of a lightweight HMD.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A device for displaying visual information to a user, the device comprising:
   a waveguide;
   a lens positioned proximate the waveguide, where the waveguide and lens are fixed relative to one another at a top portion of the waveguide and a top portion of the lens; and
   an impact absorber positioned between part of the waveguide and part of the lens, the impact absorber affixed to only one of the waveguide and the lens.

2. The device of claim 1, the impact absorber being affixed to the lens.

3. The device of claim 1, the impact absorber including an impact absorber material having an elastic modulus less than 1.5 Megapascals.

4. The device of claim 1, a lens gap between the lens and the waveguide being less than 1 millimeter.

5. The device of claim 1, the impact absorber having a height of less than 500 micrometers.

6. The device of claim 1, the impact absorber having a width of less than 900 micrometers.

7. The device of claim 1, the impact absorber having a height between 60% and 80% of a lens gap between the lens and the waveguide.

8. The device of claim 1, the impact absorber including a first impact absorber material with a first elastic modulus and a second impact absorber material with a second elastic modulus, the first elastic modulus being different from the second elastic modulus.

9. The device of claim 1, the waveguide having a thickness of less than 1 millimeter.

10. The device of claim 1, the waveguide being a waveguide stack including a plurality of waveguides.

11. The device of claim 1, the impact absorber positioned within 250 micrometers of an edge of the waveguide.

12. The device of claim 1, the impact absorber positioned within 1 millimeter of an edge of the lens.

13. The device of claim 1, the impact absorber being a first impact absorber, the device further comprising a second impact absorber.

14. The device of claim 1, the impact absorber having a first height and a second height, the first height being greater than the second height.

15. A system for displaying visual information to a user, the system including:
    a display device configured to provide a display light; and
    an optical system coupled to the display device to in-couple the display light into the optical system, the optical system including:
        a first waveguide;
        a second waveguide;
        a lens positioned proximate the first waveguide, where the first waveguide, second waveguide, and lens are fixed relative to one another at a top edge of the first waveguide, a top edge of the second waveguide, and a top edge of the lens; and
    an impact absorber positioned between the first waveguide and the lens, the impact absorber affixed to only the lens.

16. The system of claim 15, the first waveguide in optical communication with the display device to direct a first channel of the visual information to an extraction region of the first waveguide.

17. The device of claim 16, the impact absorber being positioned outside of the extraction region of the first waveguide.

18. The device of claim 15, the lens having an outer edge and a bottom edge, the impact absorber being affixed to the bottom edge of the lens.

19. The device of claim 18, the impact absorber further being affixed to the outer edge of the lens.

20. A system for displaying visual information to a user, the system including:
    a display device configured to provide a display light; and
    an optical system coupled to the display device to in-couple the display light into the optical system, the optical system including:
        a first waveguide having a thickness of less than 600 micrometers;
        a second waveguide having a thickness of less than 600 micrometers;
        a lens positioned less than 1 millimeter from the first waveguide, where the first waveguide, second waveguide, and lens are fixed relative to one another at a top edge of the first waveguide, a top edge of the second waveguide, and a top edge of the lens; and
    an impact absorber positioned between the first waveguide and the lens, the impact absorber having a height of between 200 micrometers and 950 micrometers, the impact absorber affixed to only the lens, the impact absorber positioned along at least a bottom edge of the lens.

* * * * *